(12) United States Patent
Hu

(10) Patent No.: US 7,517,134 B2
(45) Date of Patent: Apr. 14, 2009

(54) BACKLIGHT UNIT AND METHOD TO UNIFORM THE BRIGHTNESS THEREOF

(75) Inventor: Che-Chang Hu, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 33 days.

(21) Appl. No.: 11/426,012

(22) Filed: Jun. 22, 2006

(65) Prior Publication Data
US 2007/0297195 A1 Dec. 27, 2007

(30) Foreign Application Priority Data
Jun. 23, 2005 (TW) .............................. 94120967 A

(51) Int. Cl.
*F21V 7/04* (2006.01)
(52) U.S. Cl. .................. 362/633; 362/362; 362/368; 362/632; 362/634
(58) Field of Classification Search ............... 362/362, 362/368, 632–634
See application file for complete search history.

(56) References Cited

U.S. PATENT DOCUMENTS

| | | | |
|---|---|---|---|
| 6,175,396 B1 * | 1/2001 | Kim et al. ..................... | 349/58 |
| 6,835,961 B2 | 12/2004 | Fukayama | |
| 7,125,157 B2 * | 10/2006 | Fu et al. ..................... | 362/632 |
| 2003/0231499 A1 | 12/2003 | Kao | |
| 2005/0254236 A1 * | 11/2005 | Fu et al. ..................... | 362/186 |

FOREIGN PATENT DOCUMENTS

| | | |
|---|---|---|
| TW | 444872 | 7/2001 |
| TW | 552440 | 9/2003 |
| TW | 581264 | 3/2004 |

* cited by examiner

*Primary Examiner*—Sandra L. O'Shea
*Assistant Examiner*—Meghan K. Dunwiddie

(57) ABSTRACT

A backlight unit has a frame, at least one optical film, and at least one light source accommodated in the frame. The frame has a top wall, a bottom wall opposite to the top wall, two opposite side walls, and at least one protuberance integrated on the top wall. The at least one optical film includes at least one through-hole with respect to the at least one protuberance. The at least one protuberance drills through the at least one through-hole for hanging the at least one optical film on the frame.

18 Claims, 5 Drawing Sheets

`US 7,517,134 B2`

BACKLIGHT UNIT AND METHOD TO UNIFORM THE BRIGHTNESS THEREOF

BACKGROUND

The present invention relates to a backlight unit, and more particularly to a display having a backlight unit to uniform the brightness thereof.

It is well-known that the liquid crystal display (LCD) is used in many information apparatus, such as laptop computers, because of light weight, thin profile, and low power consumption. In recent years, a backlight unit built in LCD apparatus has become dominant with improvements in brightness and colorization. The backlight units are roughly classified into the direct-lighting type using a reflecting curtain or the like, and the edge-lighting type using a light guide plate. Generally, the backlight unit is disposed under the LCD panel, which utilizes a light source and a plurality of optical elements (such as optical films) to provide uniform light beams to the LCD panel. The LCD panel controls the transmission of the uniform light beams to realize an image display.

Referring to FIG. 1, a conventional backlight unit 10 for providing irradiation to an LCD panel has a frame 12, a light source accommodated in the frame 12, a diffusing plate on the light source, and a plurality of optical films 14. The diffusing plate and the optical films 14 respectively have a plurality of extending portions 16 extending outward from at least one edge thereof. The frame 12 has a plurality of grooves 18 formed on at least one sidewall, respect to the extending portion of the diffusing plate and the optical films. The diffusing plate and the optical films 14 are fixed on the frame 12 in that order from bottom to top through the plurality of extending portion accommodated in the plurality of grooves of the frame 12. However, the groove 18 can not assure a locating of the optical films especially when the backlight unit 10 is perpendicular or inclined locating. In addition, after a long-time use, the optical films 14 are easily to be deformed for high-temperature of the light sources. Thus, the extending portions 16 of the optical films 14 can not be precisely accommodated in the grooves. Therefore, the imprecise locating of the optical films influences the evenness of the outputting light beams over the whole output surface of the optical films, which directly decreases the display images.

Accordingly, what is needed is a backlight unit and a display device that can overcome the above-described deficiencies.

BRIEF SUMMARY

Accordingly, the present invention is to provide a backlight unit and a display device using the same, which uniforms the brightness of the display device.

An exemplary backlight unit according the present invention has a frame, at least one optical film, and at least one light source accommodated in the frame. The frame has a top wall, a bottom wall opposite to the top wall, two opposite side walls, and at least one protuberance integrated on the top wall. The at least one optical film includes at least one through-hole with respect to the at least one protuberance. The at least one protuberance drills through the at least one through-hole for hanging the at least one optical film on the frame.

An exemplary display device according the present invention has a display panel, a backlight unit at one side of the display panel for providing light beams to the display panel. The backlight unit has a frame, at least one optical film, and at least one light source accommodated in the frame. The frame has a top wall, a bottom wall opposite to the top wall, two opposite side walls, and at least one protuberance integrated on the top wall. The at least one optical film includes at least one through-hole with respect to the at least one protuberance. The at least one protuberance drills through the at least one through-hole for hanging the at least one optical film on the frame.

Other advantages and novel features will become more apparent from the following detailed description when taken in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
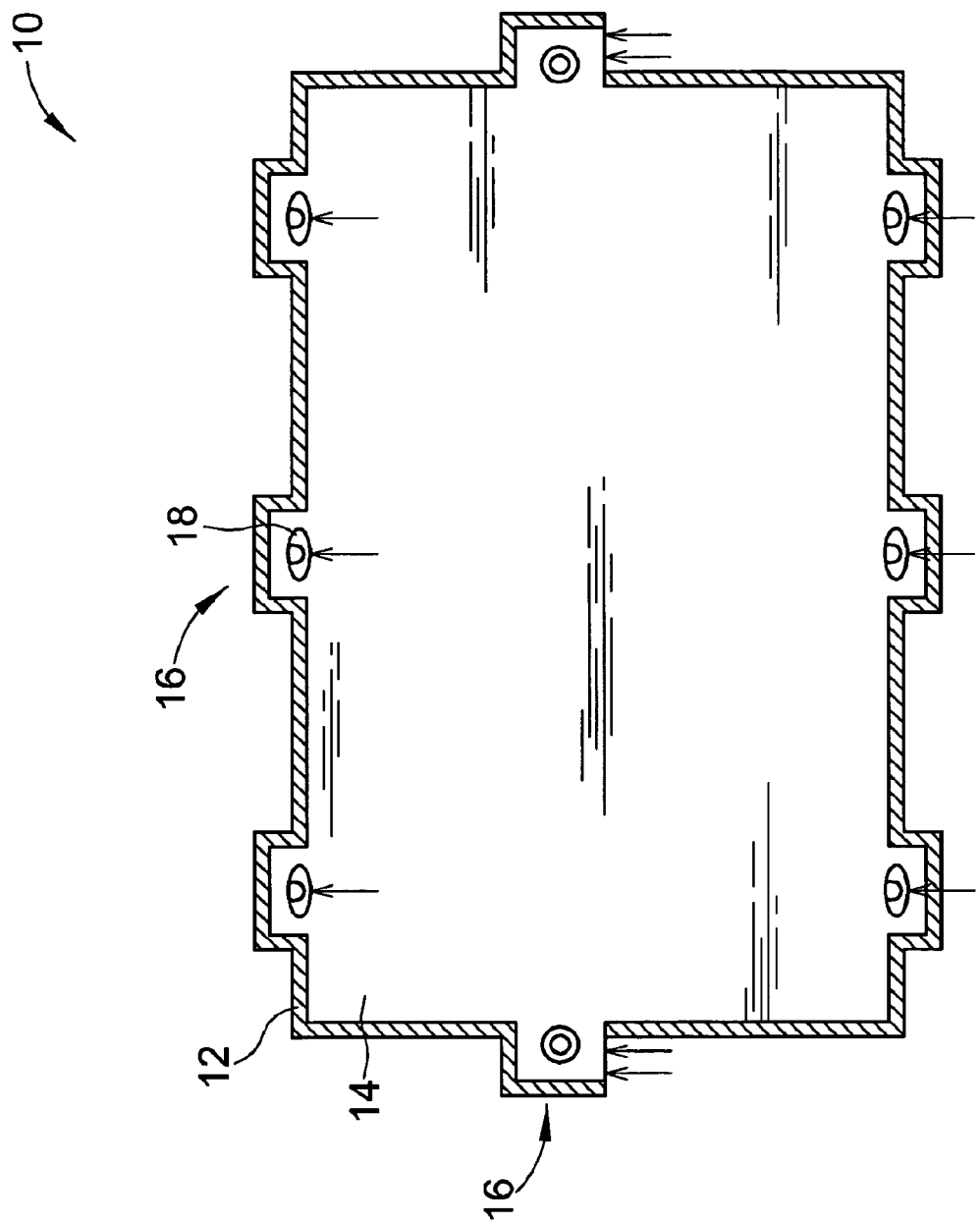
FIG. 1 shows a conventional backlight unit.
Figure 2:
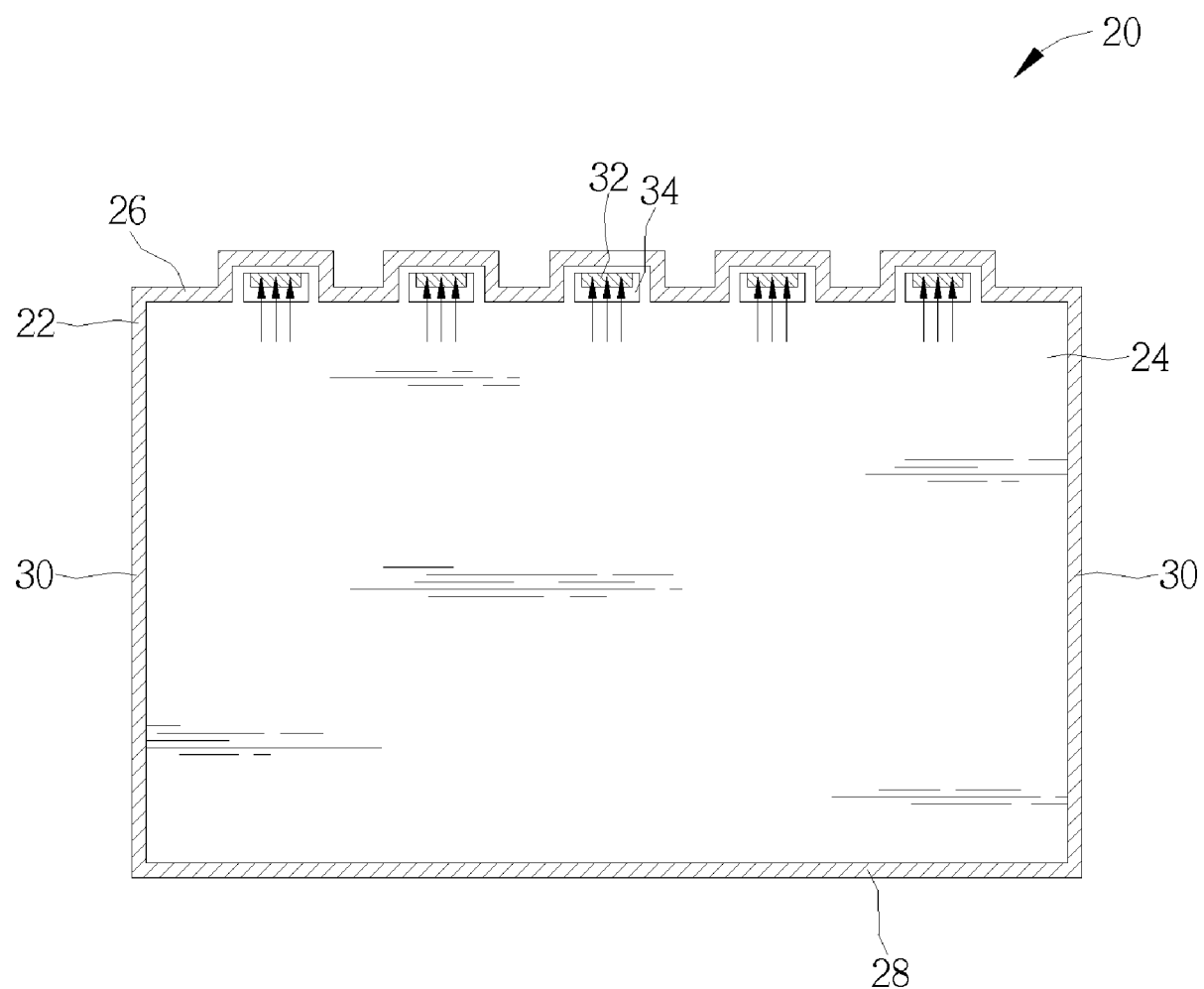
FIG. 2 is a schematic, top plan view of a backlight unit according to a first embodiment of the present invention.
Figure 3:
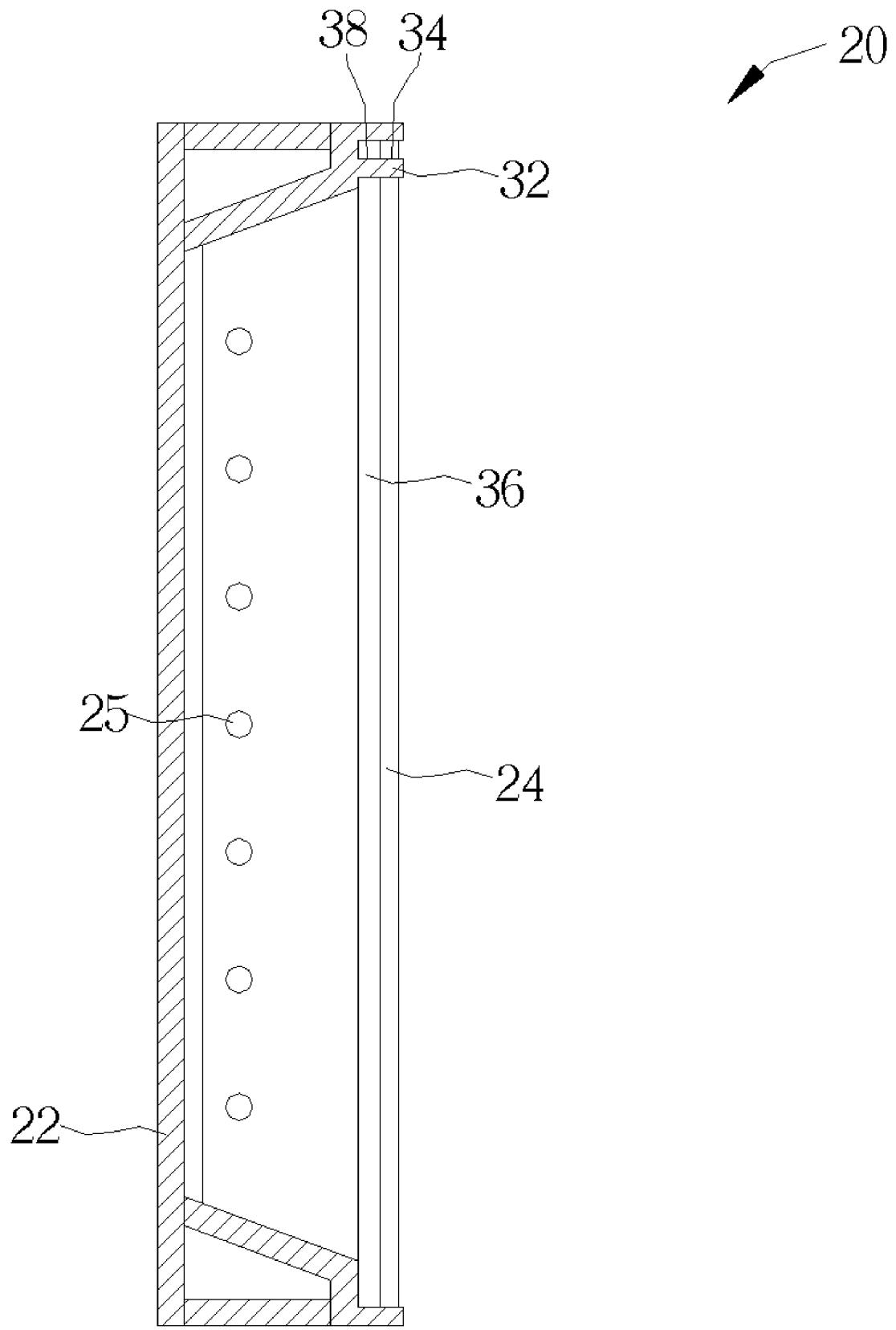
FIG. 3 is a schematic, cross-sectional view of the backlight unit of FIG. 2.

FIG. 2 and FIG. 3 show a backlight unit according a first embodiment of the present invention. FIG. 2 is a top plan view of the backlight unit, and FIG. 3 is a cross-sectional view of the backlight unit. The backlight unit 20 has a frame 22, a diffusing plate 36, at least one optical film 24, and a plurality of light sources 25. The light sources 25 are accommodated in the frame 22, under the diffusing plate 36 and the optical film 24 for providing light beams to an LCD panel.

The frame 22 has a top wall 26, a bottom wall 28, and two opposite side walls 30. The top wall 26 is opposite to the bottom wall 28. The top wall 26 and the bottom wall 28 connect with the two opposite side walls 30, respectively. The frame 22 further has a plurality of supporting protuberances 32 integrated on the top wall 26. The supporting protuberances 32 are strip-shaped or rectangular-shaped.

The diffusing plate 36 has a plurality of first supporting through holes 38 along a top side (not labeled) thereof, corresponding to the plurality of supporting protuberances 32. The size, shape, and distribution pattern are substantially similar to those of the supporting protuberances 32, which is strip-shaped or rectangular-shaped too.

The optical film 24 can be a diffuser film or a prism film or a combination of the diffuser film and the prism film. The optical film 24 has a plurality of second supporting through holes 34 along a top side (not labeled) thereof, corresponding to the plurality of supporting protuberances 32 and the first protuberances 38. The supporting through holes 34 has a size, a shape and a distribution pattern substantially similar to those of the supporting protuberances 32, which is strip-shaped or rectangular-shaped too.

In assembly, the plurality of light sources 25 is uniformly distributed in the frame 22. The diffusing plate 34, the optical film 24 is fixed on the frame 22 in that order from bottom to top. The diffusing plate 36, the optical film 24 utilize the plurality of supporting protuberances 32 of the frame 22 respectively drilling through the first and second supporting through holes 38, 34 for facilitating the hanging of the diffusing plate 36, the optical film 24 within the frame 22, when the backlight unit 20 is perpendicularly or inclined locating.

When the backlight unit 20 is perpendicular or inclined locating, the diffusing plate 34 and the optical film 24 are hanged on the frame 22. Because the first and second supporting through holes 38, 34 and the supporting protuberances 32 are strip-shaped or rectangular-shaped, the first and second supporting through holes 38, 34 and the supporting protuberances 32 realize a line-contact or a surface-contact. As shown in FIG. 2, a plurality of arrows shows the stress distribution points of the backlight unit 20 when the backlight unit 20 is perpendicular locating. The backlight unit 20 utilizes the strip-shaped or rectangular-shaped protuberance 32 to uniformly disperse the weight of the diffusing plate 36, the optical film 24 on the whole frame 22.

Figure 4:
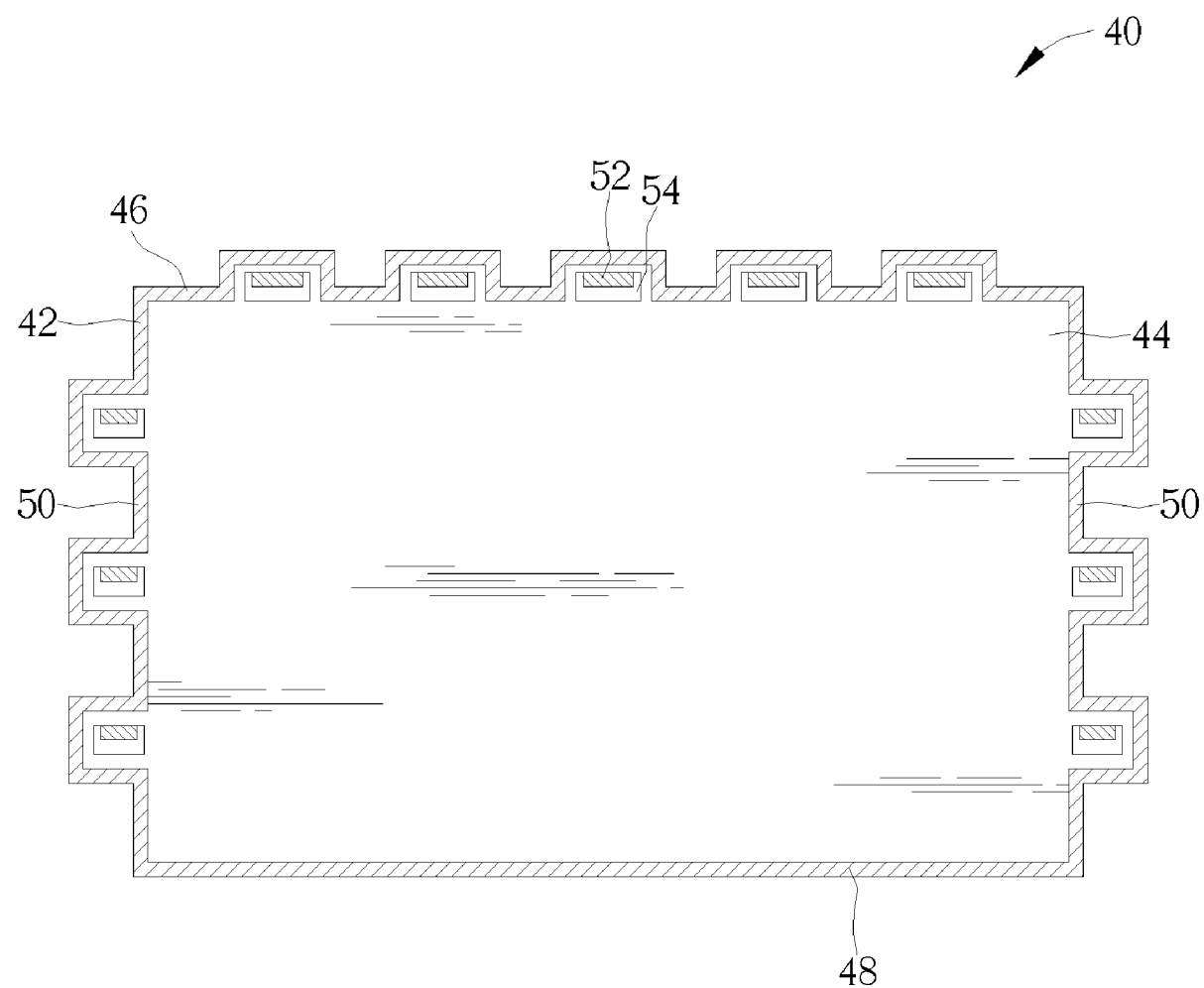
FIG. 4 is a schematic, top plan view of a backlight unit according to a second embodiment of the present invention.

Referring to FIG. 4, a backlight unit according a second embodiment of the present invention is shown. The backlight unit 40 has a frame 42, at least one optical film 44, and a plurality of light sources. The light sources are accommodated in the frame 42 and behind the optical film 44 for providing light beams to an LCD panel.

The frame 42 has a top wall 46, a bottom wall 48, and two opposite side walls 50. The top wall 46 is opposite to the bottom wall 48. The top wall 46 and the bottom wall 48 connect with the two opposite side walls 50, respectively. The frame 42 further has a plurality of supporting protuberances 52 integrated on the top wall 46 and the two opposite side walls 48. The supporting protuberances 52 are strip-shaped or rectangular-shaped.

The optical film 44 can be a diffuser film or a prism film or a combination of the diffuser film and the prism film. The optical film 44 has a plurality of supporting through holes 54 along a top edge (not labeled) and two opposite side edges (not labeled) thereof, respective to the plurality of supporting protuberances 52. The supporting through holes 54 has a size and a shape, a distribution pattern substantially similar to that of the supporting protuberances 52, which is strip-shaped or rectangular-shaped too.

In assemble, the plurality of light sources are uniformly distributed in the frame 42. The optical film 44 is fixed on the frame 42. The optical film 44 utilize the plurality of supporting protuberances 52 of the frame 42 respectively drilling through the supporting through holes 54 for facilitating the hanging of the optical film 44 within the frame 42, when the backlight unit 40 is perpendicularly or inclined locating.

When the backlight unit 40 is perpendicular or inclined locating, the optical film 44 is hanged on the frame 42. Because the supporting through holes 54 and the supporting protuberances 52 are strip-shaped or rectangular-shaped, each pair of the supporting through holes 54 and the supporting protuberances 52 realize a line-contact or a surface-contact. The backlight unit 40 utilizes the strip-shaped or rectangular-shaped protuberances 52 to uniformly disperse the weight of the optical film 54 on the whole frame 42 through the supporting protuberances 52 integrated on the top wall 46 and the two opposite side walls 48. The backlight unit 40 can further maintain the special needs of rotating the LCD panel 90 degrees to display. When the backlight unit 40 is perpendicular locating, the supporting protuberances 52 integrated on the top wall 46 hang and support the optical film 44. When the backlight unit 40 is rotated 90 degrees accordingly, the supporting protuberances 52 integrated on the two opposite side walls 48 can hang and support the optical film 44.

Figure 5:
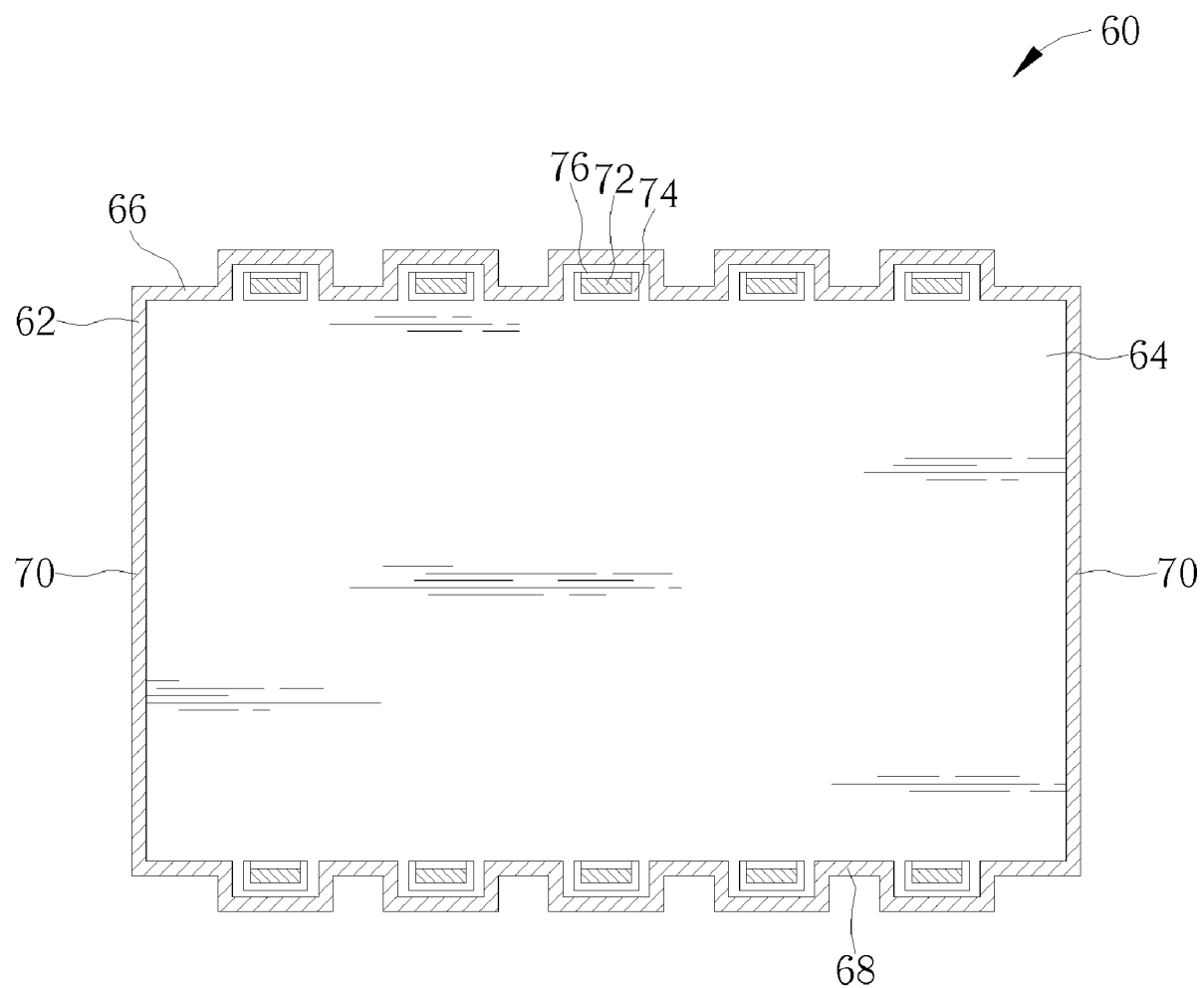
FIG. 5 is a schematic, top plan view of a backlight unit according to a third embodiment of the present invention.

Referring to FIG. 5, a backlight unit according a third embodiment of the present invention is shown. The backlight unit 60 has a frame 62, at least one optical film 64, and a plurality of light sources (not shown). The light sources are accommodated in the frame 62 and behind the optical film 64 for providing light beams to an LCD panel.

The frame 62 is made from plastic, which has a top wall 66, a bottom wall 68, and two opposite side walls 70. The top wall 66 is opposite to the bottom wall 68. The top wall 66 and the bottom wall 68 connect with the two opposite side walls 70, respectively. The frame 62 further has a plurality of supporting protuberances 72 integrated on the top wall 46 and the bottom wall 68, respectively, and a plurality of buffer elements 76 respecting to the plurality of supporting protuberances 72. The supporting protuberances 72 are strip-shaped or rectangular-shaped. The buffer elements 76 are made from rubber or other elastic material, which are disposed on or covers the supporting protuberances 72, respectively.

The optical film 64 can be a diffuser film or a prism film or a combination of the diffuser film and the prism film. The optical film 64 has a plurality of supporting through holes 74 along a top edge (not labeled) and a bottom edge (not labeled) thereof, respective to the plurality of supporting protuberances 72. The supporting through hole 74 has a size and a shape substantially similar to that of the supporting protuberances 72, which are strip-shaped or rectangular-shaped too.

In assembly, the plurality of light sources is uniformly distributed in the frame 62. The optical film 64 is fixed on the frame 62. The optical film 64 utilize the plurality of supporting protuberances 72 with the buffer elements 76 of the frame 62 respectively drilling through the supporting through holes 74 for facilitating the hanging of the optical film 64 within the frame 62, when the backlight unit 60 is perpendicularly or inclined locating.

When the backlight unit 60 is perpendicular or inclined locating, the optical film 64 is hanged on the frame 62. Because the supporting through holes 74 and the supporting protuberances 72 are strip-shaped or rectangular-shaped, each pair of the supporting through holes 74 and the supporting protuberances 62 realize a line-contact or a surface-contact. The backlight unit 60 utilizes the strip-shaped or rectangular-shaped plurality of protuberances 72 to uniformly disperse the weight of the optical film 74 on the whole frame 62 through the supporting protuberances 72 integrated on the top wall 66 and the bottom wall 68.

The backlight unit 60 utilizes the buffer elements 76 to compensate the manufacturing tolerance of the supporting protuberance 72 and the supporting through holes 74. The buffer elements 76 can avoid the uneven stress distribution produced by the manufacturing tolerance of the supporting protuberance 72. Thus, the supporting through holes 74 and the supporting protuberances 72 can have a prefer line-contact or a surface-contact, and realize a preferred uniform dispersion of the weight of the optical film 64 on the whole frame 62 through the supporting protuberances 72 and the buffer element 76 integrated on the top wall 66 and the bottom wall 68.

In an alternate embodiment, the buffer elements 76 can cooperate with pin-shaped or column-shaped supporting protuberances mentioned in BACKGROUND. Although the pin-shaped or column-shaped supporting protuberances are easy to produce large manufacturing tolerance, the buffer element 76 can still avoid the uneven stress distribution produced by the manufacturing tolerance of the pin-shaped or column-shaped supporting protuberance for its elastic deformation characteristics.

Comparing conventional backlight unit, the backlight unit 20, 40, 60 according to the embodiment of the present invention utilize the cooperation of the plurality of supporting protuberances 32, 52, 72 and the plurality of supporting through-holes 34, 54, 74 to uniformly distribute the weight of the at least one optical film 24, 34, 64 and the diffusing plate 36, when the backlight unit 20, 40, 60 is perpendicular or inclined locating. Therefore, the backlight unit 20, 40, 60 can keep a good locating of the at least one optical film 24, 34, 64 even though the at least one optical film 24, 34, 64 produce deformation for high temperature after a long use. In addition, the plurality of supporting protuberances 32, 52, 72 and the plurality of supporting through-holes 34, 54, 74 are in a shape of strip or rectangular. The plurality of supporting protuberances 32, 52, 72 and the plurality of supporting through-holes 34, 54, 74 are line-contact or surface-contact. Thus, the line-contact or surface-contact increase the contact area of the plurality of supporting protuberances 32, 52, 72 and the plurality of supporting through-holes 34, 54, 74, and assures uniform dispersion the weight of the diffusing plate 36, the optical film 24, 34, 64 on the whole frame 22, 42, 62. Moreover, the backlight unit 60 utilizes the buffer elements 76 to compensate the manufacturing tolerance of the supporting protuberance 72. The buffer elements 76 can avoid the uneven stress distribution produced by the manufacturing tolerance of the supporting protuberance 72. Thus, the supporting through holes 74 and the supporting protuberances 72 can have a prefer line-contact or a surface-contact, and realize a preferred uniform dispersion of the weight of the optical film 64 on the whole frame 62 through the supporting protuberances 72 and the buffer element 76 integrated on the top wall 66 and the bottom wall 68. Therefore, the backlight unit 20, 40, 60 according to the embodiment of the present invention can assure the locating of the optical film 24, 34, 64 and the evenness of the output light beams over the whole output surface of the optical film 24, 34, 64 even through a long time use.

In addition, the fourth embodiment of the present invention discloses a display. The display utilizes the backlight unit 20 to provide light beams to a display panel. The display panel can be a liquid crystal panel.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A backlight unit comprising:
    a frame, which comprises a top wall, a bottom wall opposite to the top wall, two opposite side walls, at least one protuberance formed on the top wall;
    at least one optical film, which includes at least one through-hole with respect to the at least one protuberance;
    at least one buffer element disposed between the at least one protuberance and the at least one through-hole; and
    at least one light source accommodated in the frame, wherein the at least one protuberance drills through the at least one through-hole and is configured to hang the at least one optical film on the frame,
    wherein the at least one through-hole includes at least one inner surface, the at least one buffer element includes at least one outer surface,
    wherein the at least one inner surface of the at least one through-hole contacts the at least one outer surface of the at least one buffer element.

2. The backlight unit as claimed in claim 1, wherein the at least one protuberance is strip-shaped or substantially rectangular-shaped in cross section, and the at least one through-hole is strip-shaped or substantially rectangular-shaped in cross section and has a size slightly larger than that of the at least one protuberance.

3. The backlight unit as claimed in claim 1, wherein the buffer element is made from rubber.

4. The backlight unit as claimed in claim 3, wherein the at least one protuberance is pin-shaped.

5. The backlight unit as claimed in claim 1, wherein the frame and the at least one protuberance are integrated.

6. The backlight unit as claimed in claim 1, wherein two more protuberances are formed on the at least one of the bottom wall or the two opposite side walls.

7. The backlight unit as claimed in claim 1, wherein the at least one protuberance and the at least one through-hole are in line-contact or surface-contact with the at least one buffer element disposed therebetween.

8. The backlight unit as claimed in claim 1, wherein the at least one optical film is at least one of a diffusing film and a prism film.

9. The backlight unit as claimed in claim 1, further comprising a diffuser plate disposed between the frame and the at least one optical film, the diffuser plate including at least one hole with respect to the at least one protuberance to drill therethrough.

10. A display device comprising:
    a display panel; and
    a backlight unit at one side of the display panel configured to provide light beams to the display panel, the backlight unit including:
    a frame, which comprises a top wall, a bottom wall opposite to the top wall, two opposing side walls, and at least one protuberance formed on the top wall;
    at least one optical film, that includes at least one through-hole with respect to the at least one protuberance;
    at least one buffer element disposed between the at least one protuberance and the at least one through-hole; and
    at least one light source accommodated in the frame,
    wherein the at least one protuberance drills through the at least one through-hole and is configured to hang the at least one optical film on the frame
    wherein the at least one through-hole includes at least one inner surface, the at least one buffer element includes at least one outer surface,
    wherein the at least one inner surface of the at least one through-hole contacts the at least one outer surface of the at least one buffer element.

11. The display device as claimed in claim 10, wherein the at least one protuberance is strip-shaped or substantially rectangular-shaped in cross section, and the at least one through-hole is strip-shaped or substantially rectangular-shaped in cross section and has a size slightly larger than that of the at least one protuberance.

12. The display device as claimed in claim 10, wherein the buffer element is made from rubber.

13. The display device as claimed in claim 10, wherein the display panel is a liquid crystal panel.

14. The display device as claimed in claim 10, wherein the frame and the at least one protuberance are integrated.

15. The display device as claimed in claim 10, wherein there are two more protuberances and formed on the at least one of the bottom wall or the two opposite side walls.

16. The display device as claimed in claim 11, wherein the at least one protuberance and the at least one through-hole are in line-contact or surface-contact with the at least one buffer element disposed therebetween.

17. The display device as claimed in claim 10, wherein the at least one optical film is at least one of a diffusing film and a prism film.

18. The display device as claimed in claim 10, further comprising a diffuser plate disposed between the frame and the at least one optical film, the diffuser plate including at least one hole with respect to the at least one protuberance configured to drill therethrough.

* * * * *